(12) United States Patent
Baumgart et al.

(10) Patent No.: US 8,147,607 B2
(45) Date of Patent: Apr. 3, 2012

(54) HYDROPHOBIC SELF-CLEANING COATING COMPOSITIONS

(75) Inventors: Richard J. Baumgart, Paris, KY (US); Subbareddy Kanagasabapathy, Lexington, KY (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 361 days.

(21) Appl. No.: 12/605,613

(22) Filed: Oct. 26, 2009

(65) Prior Publication Data

US 2011/0094417 A1  Apr. 28, 2011

(51) Int. Cl.
*C09D 1/00* (2006.01)
*C09D 5/00* (2006.01)

(52) U.S. Cl. ............... 106/287.32; 106/287.26; 106/285

(58) Field of Classification Search ............. 106/287.26, 106/287.34, 285
See application file for complete search history.

(56) References Cited

U.S. PATENT DOCUMENTS

| | | | |
|---|---|---|---|
| 3,354,022 A | 11/1967 | Dettre et al. | |
| 4,274,883 A * | 6/1981 | Lumbeck et al. | 106/490 |
| 4,900,774 A | 2/1990 | Mitsuji et al. | |
| 5,130,167 A | 7/1992 | Mitsuji et al. | |
| 5,141,915 A | 8/1992 | Roenigk et al. | |
| 5,212,241 A | 5/1993 | Woo et al. | |
| 5,269,958 A | 12/1993 | de Jager | |
| 5,432,000 A | 7/1995 | Young, Sr. et al. | |
| 5,520,956 A | 5/1996 | Kieser et al. | |
| 5,576,360 A | 11/1996 | Craun et al. | |
| 5,599,489 A | 2/1997 | Saiki et al. | |
| 5,633,314 A | 5/1997 | Jamasbi | |
| 5,705,558 A | 1/1998 | Krouse | |
| 6,020,419 A | 2/2000 | Bock et al. | |
| 6,150,318 A | 11/2000 | Silvester et al. | |
| 6,461,537 B1 * | 10/2002 | Turcotte et al. | 252/194 |
| 6,599,973 B1 | 7/2003 | Visscher et al. | |
| 6,660,363 B1 | 12/2003 | Barthlott | |
| 6,683,126 B2 | 1/2004 | Keller et al. | |
| 6,800,354 B2 | 10/2004 | Baumann et al. | |
| 6,811,856 B2 | 11/2004 | Nun et al. | |
| 6,822,040 B2 | 11/2004 | Baugh et al. | |
| 6,846,512 B2 | 1/2005 | Rohrbaugh et al. | |
| 6,852,389 B2 | 2/2005 | Nun et al. | |
| 6,858,284 B2 | 2/2005 | Nun et al. | |
| 6,977,094 B2 | 12/2005 | Oles et al. | |
| 7,006,998 B2 | 2/2006 | Granfeldt et al. | |
| 7,094,741 B2 | 8/2006 | Barnabas et al. | |
| 7,183,354 B2 | 2/2007 | Halladay et al. | |
| 7,196,043 B2 | 3/2007 | Valpey, III et al. | |
| 7,297,951 B2 * | 11/2007 | Chen et al. | 250/339.02 |
| 2001/0037876 A1 | 11/2001 | Oost et al. | |
| 2002/0016433 A1 | 2/2002 | Keller et al. | |
| 2002/0045010 A1 | 4/2002 | Rohrbaugh et al. | |
| 2002/0150723 A1 | 10/2002 | Oles et al. | |
| 2002/0150724 A1 | 10/2002 | Nun et al. | |
| 2002/0150725 A1 | 10/2002 | Nun et al. | |
| 2002/0150726 A1 | 10/2002 | Nun et al. | |
| 2003/0068486 A1 | 4/2003 | Arney et al. | |
| 2003/0114571 A1 | 6/2003 | Pan | |
| 2004/0047997 A1 | 3/2004 | Keller et al. | |
| 2004/0127393 A1 | 7/2004 | Valpey et al. | |
| 2004/0154106 A1 | 8/2004 | Oles et al. | |
| 2004/0213904 A1 | 10/2004 | Muller et al. | |
| 2005/0065242 A1 | 3/2005 | McGee et al. | |
| 2005/0103457 A1 | 5/2005 | Nun et al. | |
| 2005/0118433 A1 | 6/2005 | Oles et al. | |
| 2005/0136217 A1 | 6/2005 | Barthlott et al. | |
| 2005/0205830 A1 | 9/2005 | Oles et al. | |
| 2005/0208269 A1 | 9/2005 | Nun et al. | |
| 2005/0221107 A1 | 10/2005 | Miyai et al. | |
| 2005/0267256 A1 | 12/2005 | Nakamoto | |
| 2005/0282953 A1 | 12/2005 | Simendinger et al. | |
| 2006/0110541 A1 | 5/2006 | Russell et al. | |
| 2006/0110542 A1 | 5/2006 | Dietz et al. | |
| 2006/0178463 A1 | 8/2006 | Sacks | |
| 2007/0027232 A1 | 2/2007 | Walsh et al. | |

FOREIGN PATENT DOCUMENTS

| | | |
|---|---|---|
| CH | 268258 | 8/1950 |
| DE | 1022246 | 1/1958 |
| DE | 19917367 | 10/2000 |
| EP | 0217385 A2 | 4/1987 |
| EP | 0369581 A1 | 5/1990 |
| EP | 1040874 | 10/2000 |
| EP | 1479738 A1 | 11/2004 |
| FR | 2150474 | 4/1973 |
| GB | 1335957 | 10/1973 |
| GB | 2223761 A | 4/1990 |
| GB | 2231876 A | 11/1990 |
| GB | 2311527 | 10/1997 |
| GB | 2421727 | 7/2006 |
| WO | 9404123 A1 | 3/1994 |
| WO | 9936481 A1 | 7/1999 |
| WO | 0039239 A1 | 7/2000 |
| WO | 0058410 A1 | 10/2000 |
| WO | 0071834 A2 | 11/2000 |
| WO | 0196511 A2 | 12/2001 |
| WO | 03022935 A1 | 3/2003 |
| WO | 2007128636 | 11/2007 |

* cited by examiner

*Primary Examiner* — David M Brunsman
(74) *Attorney, Agent, or Firm* — Wood, Herron & Evans, L.L.P.

(57) ABSTRACT

Coating compositions of the present invention comprise hydrophobic particles, an alcohol, a solvent, and an effective amount of water such that coatings formed therefrom are hydrophobic. The hydrophobic particles may comprise a metal oxide, such as silica ($SiO_2$), alumina ($Al_2O_3$), titania ($TiO_2$), or zinc oxide (ZnO), or combinations thereof. In one embodiment, the hydrophobic particles comprise fumed silica. The amount of hydrophobic particles is in the range of from about 0.3 wt. % to about 2 wt. %. In one embodiment, the effective amount of water is at least about 0.066 wt. %. The ratio of the amount of the solvent to the amount of the alcohol is slightly less than 100, and, in another embodiment, is at least about 50 to 50. A surface treated with the composition is characterized by a water contact angle of 115° or more, and more particularly 135° or more.

17 Claims, No Drawings

HYDROPHOBIC SELF-CLEANING COATING COMPOSITIONS

TECHNICAL FIELD

The present invention relates to coating compositions that when applied to a surface produces a hydrophobic, self-cleaning surface.

BACKGROUND OF THE INVENTION

Hydrophobic coatings are useful for many applications. One common application is in the automotive industry. As is known, various surfaces on a vehicle are exposed to the environment. In order to preserve the appearance of vehicles, it is common for owners to apply coatings to the exposed surfaces with the goal being to keep those surfaces clean. For example, the wheel rims on a car experience a particularly harsh environment. Often, the surfaces on wheel rims accumulate, among other types of "dirt," debris from the brake pads. This debris usually has a distinctive gray/black color when it adheres to the surfaces of the wheel rim usually in the presence of moisture. Of course, the discoloration of the wheels detracts from the appearance of the vehicle and may cause permanent deterioration of the appearance of the wheel rims. Accordingly, cleaning the debris from the rims is a regular task that is made more difficult by the popular, but intricate, rim designs and by the stubborn adherence of debris to the rim's surfaces.

In an effort to thwart dirt buildup and thereby preserve surfaces, various hydrophobic coatings have been developed. These hydrophobic coatings generally repel water to some degree and thereby enable the surface to resist dirt build up. However, hydrophobic coatings that are produced by current products are defective in many ways. For example, they are difficult to apply, do not provide a sufficient amount of hydrophobicity to the surface, are not removable or are too easily removed, and/or are too costly as to make them impracticable.

There is, therefore, a need for a coating composition that, when applied, produces a surface that is hydrophobic but that is easily applied, is durable, but removable while being cost effective to manufacture. Furthermore, the degree of the hydrophobicity of the coating formed thereby should prevent the appearance of water marks, inhibit corrosion, and prevent attachment of debris, dirt, and the like.

SUMMARY OF THE INVENTION

In one embodiment, the coating composition of the present invention comprises hydrophobic particles having an average particle size between about 1 nm and about 400 nm, an alcohol, a solvent, and water, where the water is present in an effective amount sufficient to enable the composition to form hydrophobic or superhydrophobic surfaces on many materials, including uncoated metals, like chrome plated wheel rims. The water may be supplied by the alcohol and/or from another source. By comparison, those compositions that do not have sufficient water, but that have similar constituents, may not form sufficiently hydrophobic surfaces on these same surfaces. For example, a mixture of hydrophobic particles in a mixture of an alcohol and a solvent where the ratio of the solvent to the alcohol is about 85 to 15 and the mixture having about 0.049 wt. % water provides a coating on a metallic surface is characterized by a water contact angle that is between 113° and about 83°. Commercially available waxes produce coatings that provide a water contact angle of 80° to 90°. Thus, mixtures that lack an effective amount of water produce surfaces therefore do not perform much, if any, better than waxes. However, a surface treated with a composition having substantially the same ratio of the solvent to the alcohol but with at least about 0.066 wt. % water, with other constituents being substantially the same, is characterized by a water contact angle of 115° or more. For similar ratios of solvent to alcohol with even more water, for example at least about 0.081 wt. % water (about 0.015 wt. % more water), the water contact angle is at least about 135°. Therefore, according to the embodiments of the invention, the presence of an effective amount of water unexpectedly improves the hydrophobicity of the surface treated thereby.

The hydrophobic particles may comprise a metal oxide, such as silica ($SiO_2$), alumina ($Al_2O_3$), titania ($TiO_2$), or zinc oxide (ZnO), or combinations thereof. In one embodiment, the hydrophobic particles comprise fumed silica particles having an average particle size in the range of about 1 nm to about 10 nm. The amount of hydrophobic particles is in the range of from about 0.3 wt. % to about 2 wt. % of the composition. In another embodiment, the hydrophobic particles are present in an amount in the range of about 0.3 wt. % to about 1 wt. % of the composition. In one embodiment, the hydrophobic particles comprise fumed silica.

The alcohol may be isopropyl alcohol and the solvent may be mineral spirits though other suitable alcohols and solvents may be utilized. A ratio of the solvent to the alcohol may be up to about 99 to 1. By way of further example, the ratio of the solvent to the alcohol may be at least about 50 to 50, or be in the range of about 50 to 50 and about 99 to 1.

The effective amount of water may be provided by the alcohol and/or may be provided by intentional addition of water to the mixture. The amount of water may depend upon the proportions of the alcohol, solvent, and/or hydrophobic particles present in the composition. As set forth above, for a particular solvent to alcohol ratio, the effective amount of water present may be at least about 0.066 wt. %. Lesser amounts of water may depend upon the ratio of the solvent and alcohol as described above. The effective amount of water present may be up to the amount that is slightly less than an amount that causes free water to separate from the mixture. In one embodiment, the amount of water is in the range of about 0.08 wt. % to about 2.0 wt. %. In another embodiment, the amount of water may be from about 0.08 wt. % up to about 1.0 wt. % before water separates from the mixture.

Advantageously, coating compositions as described herein may be bottled in convenient spray bottles and simply sprayed onto a surface. A coating may be formed by spraying or otherwise applying the coating composition to a surface to form a film. The coating is obtained by allowing the liquids in the composition to evaporate for a sufficient amount of time, for example, for about 5 to about 10 minutes at room temperature. At least the hydrophobic particles remain on the surface once the liquids evaporate. Once the coating composition dries, the surface has improved hydrophobic properties. A surface coated with the coating composition may exhibit superhydrophobic properties and may, accordingly, be characterized by a water contact angle of 160° or more. In addition, compositions according to the present invention may form superhydrophobic surfaces on a variety of surfaces, including directly on metallic surfaces. One exemplary application in the automotive market is application of the composition to wheel rims, specifically those that have uncoated, exposed chrome plated or other metallic surfaces. However, compositions as described herein may be used to coat other surfaces, such as painted or plastic surfaces. The coated or treated surfaces stay cleaner longer, because they more readily shed water, and coated metallic surfaces resist corrosion for the same reason.

In certain normally encountered environments, the coating may be effective for two weeks or more. In that respect, the coating is more durable than other coatings. However, the coating may be removed by wiping or otherwise physically contacting the coating with sufficient force to remove the hydrophobic particles. The magnitude of the forces required being on the order of those generated with normal cleaning techniques. Thus, the coated surfaces may be removed and reapplied as desired.

DETAILED DESCRIPTION OF THE INVENTION

The present invention provides a coating composition, which, when applied to a surface and allowed to dry, improves the hydrophobicity of the surface. As is described more fully below, the compositions according to the present invention comprise a mixture of hydrophobic particles mixed with an alcohol, a solvent, and an effective amount of water.

The hydrophobic particles may be nanosized metal oxide particles. The size of the particles may be dictated by the roughness of the surface onto which the coating composition is applied. In any case, the upper limit to the particle size is determined, in part, by the visibility of the particles in the coating and/or the adherence of particles to the surface. The hydrophobic particles in the form of powders are typically described by a particle size distribution that is defined by an average particle size and a standard deviation in the average particle size. This information is typically obtained by laser diffraction techniques. As used herein, an average particle size is the average particle size from the particle size distribution. In one exemplary application on automotive wheel surfaces, an average particle size of the hydrophobic particles is between about 1 nm and about 400 nm, and in a further example, the average particle size is between about 1 nm and 10 nm. While the average size of the hydrophobic particles may measure in the ranges provided herein, particles in these size ranges are known to agglomerate where the agglomerates measure 100 nm or so in diameter.

As set forth above, the hydrophobic particles may comprise one or more metal oxides. For instance, particles may be composed of silica ($SiO_2$), alumina ($Al_2O_3$), titania ($TiO_2$), zinc oxide (ZnO), or other similar compositions or combinations thereof. If not inherently hydrophobic, the particles are made hydrophobic by treatment with a suitable compound. For example, the particles may be treated with an organosilane, alkylsilane, fluorinated silane, and/or disilazane (e.g., hexamethyldisilazane (HDMS)). Commercially available hydrophobic silica particles include AEROSIL® R 202, AEROSIL® R 805, AEROSIL® R 812, AEROSIL® R 812S, AEROSIL® R 972, AEROSIL® R 974, AEROSIL® R 8200, AEROXIDE® R LE-1, AEROXIDE® R LE-2, and AEROXIDE R LE-3, which are available from Evonik Degussa GmbH, Germany. Similar hydrophobic silica particles are also available from Cabot Corporation, Tuscola, Ill.

The composition includes an amount of hydrophobic particles sufficient to provide enough coverage on the surface for improved hydrophobic properties to be observed. The amount may depend upon various factors including particle size distribution of the hydrophobic particles, the composition of the particles, the surface roughness of the surface to be coated, and the desired appearance of the coating, among others. In one embodiment, the hydrophobic particles are present in amount in the range of from about 0.3 wt. % to about 2 wt. %, and in another embodiment, the hydrophobic particles are present in an amount in the range of from about 0.3 wt. % to about 1 wt. %. By way of example, in the case of hydrophobic silica particles having an average particle size of about 7 nm, the coating becomes progressively more noticeable as the amount of the hydrophobic particles increases beyond 1 wt. %. That is, the coating becomes noticeably white in appearance though the hydrophobicity of the coating may not be affected. Therefore, for surfaces where appearance is not an issue, for example where only corrosion resistance is required, compositions that are white or are another color may be perfectly acceptable without compromising the hydrophobicity of the surface.

The composition also contains an alcohol. Exemplary alcohols include those that are water soluble or moderately water soluble. For example, methyl alcohol, ethyl alcohol, and isopropyl alcohol or a combination thereof may be used. While the alcohol may be anhydrous, alcohol that is not anhydrous is preferred because at least some or all of the water needed may be supplied by the alcohol. The alcohol is also soluble in the solvent. For reasons set forth below, when taking into account the amount of the solvent, in one embodiment, a ratio of the amount of the solvent to the amount of the alcohol approaches 100. In other words, the composition may comprise nearly all solvent though a measurable amount of alcohol is present. For example, the ratio may be up to about 99 to 1 or so. By way of additional example, the ratio of the solvent to the alcohol may be from about 10 to 90 to about 90 to 10. In one exemplary embodiment, the ratio of solvent to alcohol is at least about 50 to 50.

The solvent may be selected from one or more organic solvents which are suitable for use with the alcohol as well as compatible with the surface to be coated. The solvent may be added to increase the flash point of the composition to a value higher than that of the alcohol alone for safety purposes and to reduce cost. Additionally, the solvent may be selected to adjust the evaporation rate of the liquid in the composition from a film of the composition when a surface is coated. An exemplary solvent is mineral spirits, such as Rule 66 mineral spirits, however, other suitable solvents, such as hexane, heptane, or other non-polar hydrocarbon solvents or combinations thereof, may be included in the composition.

The composition also contains an effective amount of water. The presence of the effective amount of water in the composition unexpectedly improves the hydrophobicity of a coating made therefrom. As set forth above, the water may be provided by the alcohol, described above, and/or added independently. By way of example, the effective amount of water may be about 0.066 wt. % or more. However, the effective amount of water may be an amount that is less than 0.066 wt. % because the effective amount of water depends on the ratio of the amount of the solvent and the alcohol as well as the compositions thereof. By way of example, a formulation of a ratio of mineral spirits to isopropyl alcohol of about 85 to 15 with about 0.65 wt. % AEROSIL® R 812S and about 0.066 wt. % water from the isopropyl alcohol was observed to be clear. In other words, no separation of the liquids was observed. A chrome plated surface treated with this formation exhibited a water contact angle of about 115°. By way of further example, increasing the water content to 0.081 wt. % by adding 0.015 wt. % water to about the same ratio of solvent to alcohol set forth above also produces a clear formula, but the coating produced therefrom provides a hydrophobic surface having a water contact angle of about 135°. This represents a 17% improvement in the water contact angle by adding 0.015 wt. % water.

Additional water may be added. However, at some amount of water, the water may separate from the formulation. Separation of water often does not degrade the hydrophobicity of a coating formed thereby. By way of example, and not limitation, the effective amount of water may be around 1.8 wt. % with a similar ratio of solvent to alcohol. While water may separate from this composition, the water contact angle of a coating formed with the composition exceeds 135°. However, consumers tend to have a negative response to the separation of components in a container. In addition, formulas where water separation occurs may cause a coating with streaks when the liquid components evaporate though the hydrophobicity of the coating may be at least about 115°. Therefore, from a marketing perspective, it is preferable to keep the amount of water to less than an amount that causes water to separate. The composition may further include other ingredients that do not materially affect the hydrophobicity of the coating formed from the composition, such as a fragrance or a propellant.

As used herein, "consisting essentially of" means that no other ingredients are intentionally added to the coating composition that result in deterioration in the hydrophobicity of the coating to a point where the water contact angle is less than 115°. However, impurity content from the hydrophobic particles, the alcohol, the solvent, or the preparation process may be contemplated.

The composition may be applied to the surface of a substrate by dispersing the composition into fine droplets and distributing the droplets over the surface. The droplets may form a film of the composition over the surface. The alcohol, water, and solvent evaporate from the film leaving the hydrophobic particles on the surface. The particles adhere to the surface and may form a non-continuous layer or a continuous layer of particles. The hydrophobicity of the coated surface is improved causing droplets of water residing thereon to form a contact angle of 115° or greater with respect to the coated surface, and by way of further example, the contact angle may be 135° or greater. By way of comparison, conventional automotive water repellant products, such as waxes and the like, cause water droplets to form a water contact angle of only 80 to 90°, at most. In one exemplary application, compositions of the present invention form hydrophobic surfaces on uncoated, exposed metallic surfaces. Additionally, the coating compositions of the present invention are often transparent or clear, though they may be translucent depending upon the composition and the surface to be coated.

In order to facilitate a more complete understanding of the embodiments of the invention, the following Table is provided.

TABLE 1

| | Formulation (wt. %) | | | | | | | |
|---|---|---|---|---|---|---|---|---|
| | A | B | C | D | E | F | G | H |
| AEROSIL ® R812S | 0.65 | 0.65 | 0.65 | 0.65 | 0.65 | 0.65 | 0.65 | 0.65 |
| Mineral Spirits | 84.335 | 84.32 | 84.209 | 83.609 | 83.409 | 82.409 | 83.109 | 82.609 |
| Isopropyl Alcohol (IPA) | 14.934 | 14.934 | 14.934 | 14.934 | 14.934 | 14.934 | 14.934 | 14.934 |
| Added Water | 0 | 0.015 | 0.126 | 0.726 | 0.926 | 1.926 | 1.226 | 1.726 |
| Fragrance | 0.015 | 0.015 | 0.015 | 0.015 | 0.015 | 0.015 | 0.015 | 0.015 |
| Water from IPA | 0.066 | 0.066 | 0.066 | 0.066 | 0.066 | 0.066 | 0.066 | 0.066 |
| Total | 100 | 100 | 100 | 100 | 100 | 100 | 100 | 100 |
| Appearance (formulation) | clear | clear | clear | clear | clear | Not clear | Not clear | Not clear |
| Performance | good | very good | excellent | excellent | excellent | excellent | very good | excellent |
| Contact angle | 115° | 135° | 150° | 160° | 160° | 159° | 160° | 160° |

In one embodiment, the coating composition consists essentially of about 0.3 wt. % to about 1 wt. % hydrophobic silica particles having an average particle size in the range of from about 1 nm to about 10 nm, a solvent and an alcohol in a ratio of at least about 50 to 50, and an effective amount of water in the range of from about 0.066 wt. % to about 2 wt. %. The coating formed on the surface of a substrate is characterized by a water contact angle of 115° or more. In another embodiment, the ratio of the amount of the solvent to the amount of the alcohol is at least about 70 to 30. In another embodiment, the effective amount of water may be in the range of about 0.08 wt. % to about 1 wt. % whereby the water contact angle on a surface treated therewith is at least about 135°.

With reference to Table 1, the "appearance" of each of the formulations (A-H) represents empirical observations of the formula. As noted in Table 1, when water is added to the formulation for a given amount of solvent and alcohol, water may separate from the formulation resulting in a formulation that was not clear, as noted.

Each of the formulations was dispensed onto chrome plating that was designed to simulate the surface of commercially available wheel rims and other chrome plated trim found on automobiles. Once the liquid components of the formulation evaporated, the appearance of the coating was noted as good, very good, or excellent. It was specifically noted that while formulation "F" was not clear, the performance of the coating formed therefrom was very good, though slight streaking of the coating was observed and the wetting angle of 160° was measured.

The water contact angle was determined by placing a droplet of water on a surface and taking measurements of the drop and/or measuring the wetting angle that forms at the liquid-surface interface. One standard method used to measure the water contact angle is by measuring the maximum height and width of a sessile drop. Based on a ratio of the drop height to the drop width, the contact angle between the drop and the surface is calculated according to known equations. According to this method, the wetting angle of a droplet of water on the chrome plated surface treated with individual ones of the formulations provided in Table 1 were measured. The measurement was made with an instrument available from KRUSS USA, Matthews, N.C.

While the present invention has been illustrated by the description of embodiments and examples thereof, and while the embodiments have been described in considerable detail, they are not intended to restrict or in any way limit the scope of the appended claims to such detail. Additional advantages and modifications will readily appear to those of ordinary skill in the art. The invention in its broader aspects is therefore not limited to the specific details and illustrative examples shown and described. Accordingly, departures may be made from such details without departing from the scope of the general inventive concept.

What is claimed is:

1. A coating composition for forming a coating on a substrate, the composition comprising:
   about 0.3 wt. % to about 2 wt. % hydrophobic particles having an average particle size between about 1 nm and about 400 nm;
   an alcohol;
   a solvent; and
   an effective amount of water, wherein the coating formed on the substrate is characterized by having a water contact angle of at least about 115°.

2. The coating composition of claim 1 wherein the hydrophobic particles comprise at least one of silica, alumina, titania, or zinc oxide, or combinations thereof.

3. The coating composition of claim 1 wherein the hydrophobic particles comprise fumed silica.

4. The coating composition of claim 1 wherein the average particle size is in the range of from about 1 nm to about 10 nm.

5. The coating composition of claim 4 wherein the amount of the hydrophobic particles present is in the range of from about 0.3 wt. % to about 1 wt. %.

6. The coating composition of claim 1 wherein the alcohol comprises isopropyl alcohol.

7. The coating composition of claim 1 wherein a ratio of the solvent to the alcohol is at least about 50 to 50.

8. The coating composition of claim 1 wherein the effective amount of water is at least about 0.066 wt. % of the composition.

9. The coating composition of claim 1 wherein the effective amount of water is an amount in the range of about 0.08 wt. % to an amount just less than the amount that causes water to separate therefrom.

10. The coating composition of claim 1 wherein the effective amount of water is in the range of about 0.08 wt. % to about 1 wt. %.

11. The coating composition of claim 1 wherein the solvent comprises mineral spirits.

12. A coating composition for forming a coating on a substrate consisting essentially of:
    about 0.3 wt. % to about 1 wt. % hydrophobic silica particles having an average particle size in the range of from about 1 nm to about 10 nm;
    a solvent;
    an alcohol; and
    water in an amount in the range of from about 0.066 wt. % to about 2 wt. %, wherein the coating formed on the substrate is characterized by having a water contact angle of 115° or more.

13. The coating composition of claim 12 wherein water is present in an amount in the range of from about 0.08 wt. % to about 1 wt. %.

14. The coating composition of claim 12 wherein the alcohol comprises isopropyl alcohol.

15. The coating composition of claim 12 wherein a ratio of the amount of the solvent to the amount of the alcohol is at least about 50 to 50.

16. The coating composition of claim 12 wherein a ratio of the amount of the solvent to the amount of the alcohol is at least about 70 to 30.

17. The coating composition of claim 12 wherein the solvent comprises mineral spirits.

* * * * *